US012598402B2

(12) United States Patent
Panicacci et al.

(10) Patent No.: US 12,598,402 B2
(45) Date of Patent: Apr. 7, 2026

(54) PARTIAL PIXEL OVERSAMPLING FOR HIGH DYNAMIC RANGE IMAGING

(71) Applicant: APPLE INC., Cupertino, CA (US)

(72) Inventors: Roger A Panicacci, Los Gatos, CA (US); Ashirwad Bahukhandi, Los Gatos, CA (US); Andrew Kenneth John McMahon, Redwood City, CA (US)

( * ) Notice: Subject to any disclaimer, the term of this patent is extended or adjusted under 35 U.S.C. 154(b) by 252 days.

(21) Appl. No.: 18/353,085

(22) Filed: Jul. 16, 2023

(65) Prior Publication Data

US 2025/0024170 A1    Jan. 16, 2025

(51) Int. Cl.
| | |
|---|---|
| *H04N 25/59* | (2023.01) |
| *H04N 25/77* | (2023.01) |
| *H04N 25/771* | (2023.01) |
| *H04N 25/78* | (2023.01) |

(52) U.S. Cl.
CPC ............. *H04N 25/59* (2023.01); *H04N 25/77* (2023.01); *H04N 25/771* (2023.01); *H04N 25/78* (2023.01)

(58) Field of Classification Search
CPC ...... H04N 25/59; H04N 25/77; H04N 25/771; H04N 25/78
See application file for complete search history.

(56) References Cited

U.S. PATENT DOCUMENTS

| 5,144,442 | A | 9/1992 | Ginossar et al. |
| 6,486,504 | B1 | 11/2002 | Guidash |
| 6,570,617 | B2 | 5/2003 | Fossum et al. |
| 8,068,155 | B2 | 11/2011 | Muroshima et al. |
| 8,169,517 | B2 | 5/2012 | Poonnen et al. |
| 8,606,009 | B2 | 12/2013 | Sun |
| 9,344,635 | B2 | 5/2016 | Vogelsang et al. |

(Continued)

FOREIGN PATENT DOCUMENTS

| DE | 102021209943 A1 | 3/2022 |
|---|---|---|
| EP | 2123019 B1 | 9/2019 |
| KR | 20200098764 A | 8/2020 |
| WO | 2023018841 A9 | 2/2023 |

OTHER PUBLICATIONS

Theuwissen, "CMOS Image Sensors: State-of-the-Art," Solid-State Electronics, vol. 52, pp. 1401-1406, year 2008.

(Continued)

*Primary Examiner* — Nicholas G Giles

(57) ABSTRACT

An imaging device includes a pixel-circuit and a readout circuit. The pixel-circuit includes a photodetector. The readout circuit is configured to perform a series of iterations, each iteration including (i) accumulating an electrical charge in the photodetector during an integration time, (ii) transferring a portion of the electrical charge accumulated in the photodetector to a floating diffusion, the portion being less than all the electrical charge accumulated in the photodetector, and (iii) coupling a voltage of the floating diffusion to a storage capacitance, to subsequently, in a final iteration, transfer a remaining electrical charge from the photodetector, and to derive an output digital value, indicative of a total energy of the light incident on the photodetector over the series of iterations and the final iteration, from the voltage on the storage capacitance and from the remaining electrical charge transferred in the final iteration.

18 Claims, 8 Drawing Sheets

(56) References Cited

U.S. PATENT DOCUMENTS

| | | | |
|---|---|---|---|
| 9,571,774 B2 | 2/2017 | Koifman et al. | |
| 9,930,278 B2 | 3/2018 | Koifman et al. | |
| 10,205,903 B2 | 2/2019 | Koifman et al. | |
| 10,250,832 B1 | 4/2019 | Xu et al. | |
| 10,798,322 B2 | 10/2020 | Smith et al. | |
| 10,859,434 B2 | 12/2020 | Panicacci | |
| 11,336,860 B2 | 5/2022 | Yonemoto | |
| 2009/0059044 A1 | 3/2009 | Tay | |
| 2010/0039543 A1 | 2/2010 | Muroshima et al. | |
| 2010/0271517 A1 | 10/2010 | De Wit et al. | |
| 2011/0304755 A1 | 12/2011 | Kondo | |
| 2014/0159702 A1 | 6/2014 | Doege | |
| 2016/0165160 A1* | 6/2016 | Hseih | H04N 25/7795 |
| | | | 348/308 |
| 2016/0240572 A1 | 8/2016 | Koifman et al. | |
| 2016/0241795 A1 | 8/2016 | Nishihara | |
| 2016/0269661 A1 | 9/2016 | Hseih et al. | |
| 2017/0118430 A1 | 4/2017 | Koifman et al. | |
| 2018/0184026 A1 | 6/2018 | Kato et al. | |
| 2018/0227516 A1 | 8/2018 | Mo et al. | |
| 2018/0227523 A1 | 8/2018 | Mo et al. | |
| 2020/0260037 A1 | 8/2020 | Cho | |
| 2020/0382726 A1 | 12/2020 | Inaoka et al. | |
| 2021/0051287 A1* | 2/2021 | Panicacci | H04N 25/443 |
| 2023/0011827 A1 | 1/2023 | Cho et al. | |

OTHER PUBLICATIONS

Shukri, "Apple's Newest iPhone Three Camera System is "Campacked"," Image Sensors Technology, TechInsights Inc., pp. 1-10, year 2023.

Spivak et al., "Wide-Dynamic-Range CMOS Imaging Devices—Comparative Performance Analysis", IEEE Transactions on Electron Devices, vol. 56, No. 11, pp. 2446-2461, Nov. 2009.

Wikipedia, "Internet of Things (IoT)," pp. 1-53, latest edit Apr. 18, 2023.

Robidoux et al., "End-to-end High Dynamic Range Camera Pipeline Optimization," Conference Paper, Conference on Computer Vision and Pattern Recognition (CVPR) 2021, pp. 1-11, year 2021.

Ernst et al., "HDR+ with Bracketing on PixelPhones," Blog, Google Research, pp. 1-8, Apr. 23, 2021, as downloaded from as downloaded from https://blog.research.google/2021/04/hdr-with-bracketing-on-pixel-phones.html.

Koifman, U.S. Appl. No. 18/322,629, filed May 24, 2023.

Koifman, U.S. Appl. No. 18/335,157, filed Jun. 15, 2023.

Koifman, U.S. Appl. No. 18/337,001, filed Jun. 18, 2023.

Notice of Allowance, U.S. Appl. No. 18/772,182, mailed Dec. 31, 2025.

List of References Cited by the Examiner, U.S. Appl. No. 18/772,182, dated Dec. 31, 2025.

* cited by examiner

_840_

_850_

_860_

_830_

_870_

_820_

System or device

_880_

_800_

_810_

_890_

Non-transitory computer-readable medium ～ 910

Design Information ～ 915

Semiconductor Fabrication System ～ 920

Integrated Circuit ～ 930

PARTIAL PIXEL OVERSAMPLING FOR HIGH DYNAMIC RANGE IMAGING

FIELD OF THE DISCLOSURE

The present disclosure relates generally to imaging devices, and particularly to systems and methods that extend the dynamic range of imaging devices.

BACKGROUND OF THE DISCLOSURE

The dynamic range of imaging devices is typically determined by the ratio between the strongest signal that a pixel can capture and the weakest signal that the pixel can detect.

U.S. Pat. No. 5,144,442 discloses a wide dynamic range video imaging apparatus, comprising a) a sensor for providing a plurality of video images of a scene at different exposure levels and b) a processor for processing the plurality of video images to produce a combined video image including image information from the plurality of video images by applying neighborhood transforms to the plurality of video images, the processor comprising a selector for locally selecting the operating levels of the dynamic range of the combined video image within the dynamic range of the sensor, whereby the resulting video image includes image information from the plurality of video images with enhanced information content at local areas therein.

U.S. Pat. No. 8,606,009 discloses techniques and tools for high dynamic range (HDR) image rendering and generation. An HDR image generating system performs motion analysis on a set of lower dynamic range (LDR) images and derives relative exposure levels for the images based on information obtained in the motion analysis. These relative exposure levels are used when integrating the LDR images to form an HDR image. An HDR image rendering system tone-maps sample values in an HDR image to a respective lower dynamic range value and calculates local contrast values.

Lastly, in "Wide-Dynamic-Range CMOS Imaging devices-Comparative Performance Analysis", A. Spivak et. al (IEEE TRANSACTIONS ON ELECTRON DEVICES, VOL. 56, NO. 11, NOVEMBER 2009), the authors assert that a large variety of solutions for widening the dynamic range of CMOS imaging devices has been proposed, and then propose a set of criteria for a comparative analysis of the performance of wide-DR (WDR) sensors. The authors divide WDR sensors into seven categories, and then compare the sensors of the various categories based on the proposed comparative analysis criteria.

SUMMARY OF THE DISCLOSURE

An embodiment that is described herein provides an imaging device including a pixel-circuit and a readout circuit. The pixel-circuit includes a photodetector configured to accumulate electrical charge in response to incident light. The readout circuit is configured to perform a series of iterations, each iteration including (i) accumulating an electrical charge in the photodetector during an integration time, (ii) transferring a portion of the electrical charge accumulated in the photodetector to a floating diffusion, the portion being less than all the electrical charge accumulated in the photodetector, and (iii) coupling a voltage of the floating diffusion to a storage capacitance, to subsequently, in a final iteration, transfer a remaining electrical charge from the photodetector, and to derive an output digital value, indicative of a total energy of the light incident on the photodetector over the series of iterations and the final iteration, from the voltage on the storage capacitance and from the remaining electrical charge transferred in the final iteration.

In some embodiments, the readout circuit is configured to couple the voltage of the floating diffusion to the storage capacitance via a variable capacitance, and to vary a capacitance of the variable capacitance across the series of iterations, thereby coupling to the storage capacitance a weighted average of voltages of the floating diffusion from the iterations. In an embodiment, the readout circuit is further configured to vary the integration time between at least two of the iterations. In an example embodiment, the readout circuit is configured to couple the variable capacitance to the storage capacitance by applying a controlled slew-rate signal to a gate of a transistor.

In an embodiment, the variable capacitance is shared with at least one other pixel circuit. In a disclosed embodiment, the pixel circuit further includes a reset device configured to reset the floating diffusion, and the readout circuit is further configured to couple the voltage of the floating diffusion via the variable capacitance to a reset storage capacitance. In an embodiment, the readout circuit is further configured to derive the output digital value from the difference between the voltage on the storage capacitor and the voltage on the reset storage capacitor.

In an embodiment, the pixel circuit further includes a transistor, configured to transfer the portion of the electrical charge to the floating diffusion responsively to a voltage applied to a control terminal of the transistor. In another embodiment, the readout circuit is configured to couple the voltage of the floating diffusion to one or more other storage capacitances, to compensate for movement of the imaging device. In yet another embodiment, the readout circuit is configured to couple voltages of a plurality of floating diffusions to the storage capacitance, thereby weight-averaging electrical charges from a plurality of photodetectors to produce a kernel operation.

In still another embodiment, the readout circuit is configured to couple voltages of a set of floating diffusions corresponding to neighboring pixel circuits, thereby producing a reduced resolution image. In another embodiment, the readout circuit is further configured to sparsely sample the photodetector, thereby blurring high illumination image portions. In some embodiments, the readout circuit is configured to adapt a count of the iterations in the series.

In some embodiments, the readout circuit is configured to transfer the electrical charge from the photodetector to the storage capacitance, both for the iterations in the series and for the final iteration, and then derive the output digital value from the voltage on the storage capacitance. In alternative embodiments, the readout circuit is configured to (i) transfer the electrical charge from the photodetector to the storage capacitance for the iterations in the series, and derive a first interim digital value from the voltage on the storage capacitance, (ii) transfer the electrical charge from the photodetector to the storage capacitance separately for the final iteration, and derive a second interim digital value from the voltage on the storage capacitance, and (iii) derive the output digital value from the first and second interim digital values.

There is additionally provided, in accordance with an embodiment that is described herein, an imaging method including accumulating electrical charge in a photodetector in response to incident light. A series of iterations is performed, each iteration including (i) accumulating an electrical charge in the photodetector during an integration time, (ii) transferring a portion of the electrical charge accumulated in the photodetector to a floating diffusion, the portion being less than all the electrical charge accumulated in the photodetector, and (iii) coupling a voltage of the floating diffusion to a storage capacitance. Subsequently, in a final iteration, a remaining electrical charge is transferred from the photodetector. An output digital value, indicative of a total energy of the light incident on the photodetector over the series of iterations and the final iteration, is derived from the voltage on the storage capacitance and from the remaining electrical charge transferred in the final iteration.

The present invention will be more fully understood from the following detailed description of the embodiments thereof, taken together with the drawings in which:

DETAILED DESCRIPTION OF EMBODIMENTS

Overview

Figure 1:
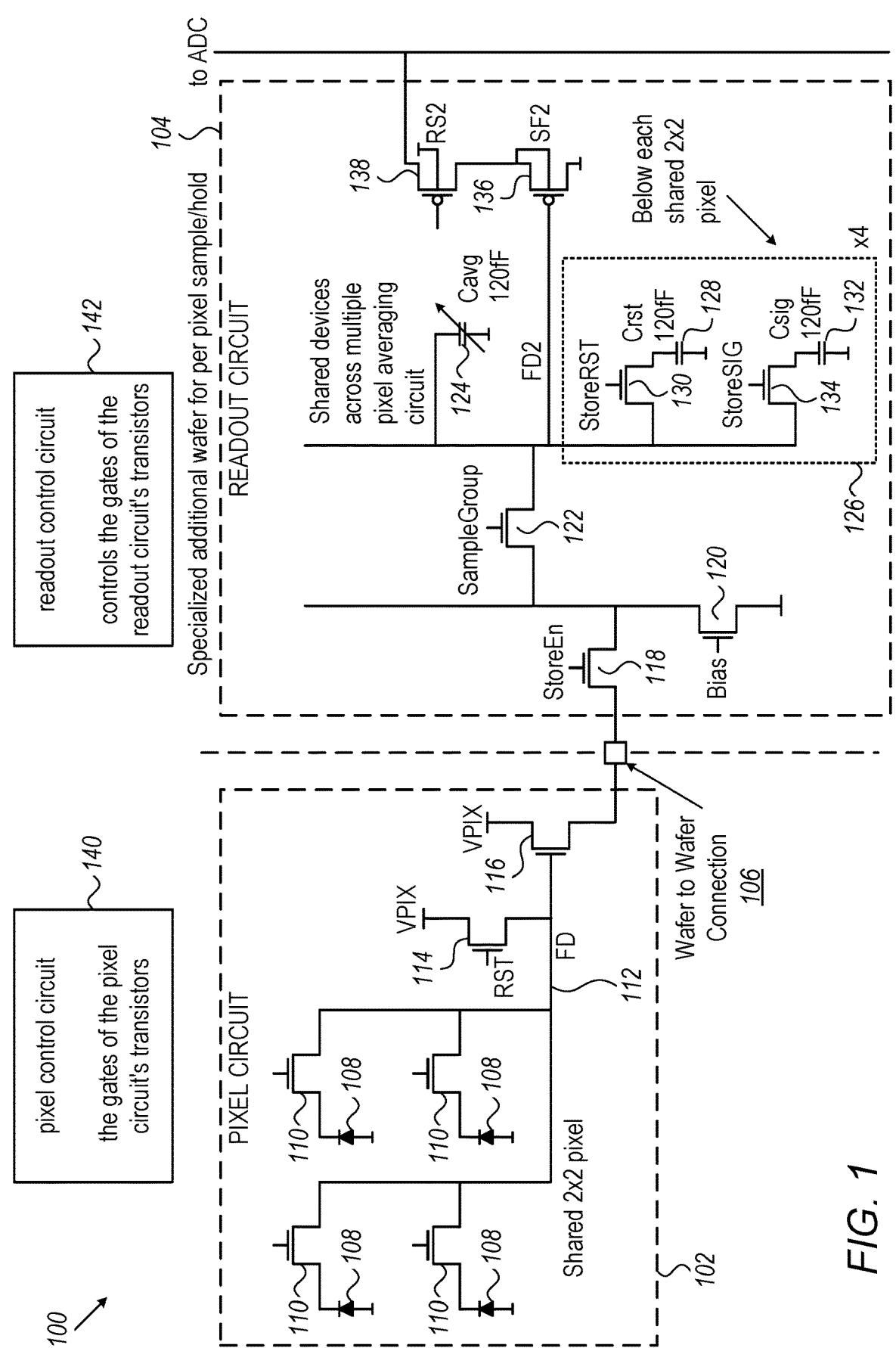
FIG. 1 is a block diagram that schematically illustrates an imaging device, in accordance with an embodiment that is described herein.

The dynamic range of an imaging device is typically defined as the ratio between the brightest and darkest signal that can be captured in a single image. In imagers comprising photodiodes, for example, the darkest signal is derived from the photodiode noise with no illumination, whereas the brightest signal is derived from the photodiode's well capacity.

High Dynamic Range (HDR) imaging is a technique used to increase the dynamic range of an imaging device. Traditionally, HDR is achieved by capturing multiple images (e.g., two) of the same scene, each at a different exposure level, and then combining them to produce a single image with a wider dynamic range. The drawback of this technique, however, is that it may create motion artifacts. Additionally, to combine multiple images, a relatively large frame memory is required, increasing silicon size and cost.

Embodiments that are disclosed herein provide for systems and methods to capture increased signal from the pixel within a single exposure. The disclosed techniques increase dynamic range without adding motion artifacts.

In embodiments, the imaging device periodically reads out and stores photodiode charge that exceeds a preset level. This technique is referred to as "partial oversampling". In an example implementation, the signal storage circuitry for a given photodiode is located beneath the respective photodiode and comprises two sample and hold circuits to store the pixel reset level and the photodiode signal (the photodiode signal will be sometimes referred to hereinbelow, for brevity, as "signal"). In an embodiment, the sample and hold circuit comprises two voltage domain switches and capacitors to hold the pixel and reset output voltages. In embodiments, Metal-Oxide Silicon MOS transistors are used for switching and amplification purposes. Such MOS transistors will be referred to as NMOS (for N-type MOS) or PMOS (for P-type MOS). When an NMOS is used as a switch, it will sometimes be referred to as a "switch".

In a disclosed embodiment, the imaging device comprises a pixel circuit and a readout circuit, which, in some embodiments, are in two separate wafers. The pixel circuit comprises a plurality (e.g., four) of photodiodes (PDs) that are coupled through a plurality of NMOS switches to a floating diffusion (FD), a Reset NMOS to reset the floating diffusion and a source follower (SF) NMOS to generate a replica of the voltage on the FD.

The PDs integrate electric charge responsively to incident light. The pixel circuit is configured to apply a partial voltage-swing pulse to the gates of the NMOS switches to transfer part of the accumulated charge from the PD to the FD ("partial transfer", or "partial drainage"), or a full voltage swing pulse to move all (or almost all) the charge ("full transfer" or "full drainage"). In embodiments, the pixel circuit, during the exposure time of the imaging device, performs a plurality of partial transfers ("partial over-sampling"), and then performs a single full transfer to move the residual charge from the PD to the FD. In an embodiment, the PD is a pinned photodiode, that is completely drained of all electrons when transfer gate voltage and the FD voltage are sufficiently high.

In addition to the standard pixel readout circuit with pixel reset and source follower buffer, the new readout circuit comprises a Store-En NMOS switch to select the pixel and transfer the voltage replica, a bias NMOS, a Sample-Group NMOS to connect to the shared pixel output line, an averaging variable capacitance circuit, a reset-store sample and hold (S&H, e.g., a reset-storage capacitor and a switch), and a signal-store S&H, comprising a signal-store capacitor). All the charge from the PD is captured either in the readout circuit or is contained within the PD. The exact amount of charge captured by each partial transfer is not critical because any variation in signal captured will either be captured by the readout circuit or remain in the photodiode. This characteristic is critical since the expected variations in pixel devices and other noise sources make the excess signal capture variable.

The full-transfer signal at the end of the exposure period is combined with the signal stored in the storage capacitors to reconstruct the final pixel output. In some embodiments this combination is done digitally after the sampled signal is converted to a digital form.

In an embodiment, the variable capacitance circuit comprises a plurality of switched capacitors; when the pixel circuit outputs the first partial-transfer signal, the readout circuit stores the signal in the signal storage capacitor; when the pixel circuit sends further partial transfer signals, the readout circuit first stores the signals in the variable capacitance circuit and then connects the variable capacitance circuit to the signal storage capacitor; the size of the capacitor is set such that the coupling of the variable capacitor to the storage capacitor will update the average signal that is stored in the storage capacitor. For example, if the signal storage capacitor is 120 fF, the capacitance of the variable capacitance circuit will be 120 fF in the second partial transfer, 60 fF in the third, 40 fF in the fourth, and so on (the variable capacitance is equal to the storage capacitance divided by the partial transfer number). The voltage corresponding to the last full-transfer will not be averaged; instead, the average voltage (multiplied by the number of partial transfers) and the last full-transfer voltage will be combined (typically in the digital domain).

In an embodiment, a similar mechanism is used for the reset voltage, which is stored in a reset storage capacitor; the average reset voltage (multiplied by the number of partial transfers) and the last reset voltage will be combined, and subtracted from the combined pixel value, to provide a correlated final pixel value.

Other embodiments that are disclosed herein describe other use cases of the present disclosure.

DESCRIPTION OF EMBODIMENTS

The disclosure hereinbelow refers to photodiodes (PDs). It should be noted, however, that the present disclosure is not limited to sharing scheme for PDs" and "in alternative embodiment, any other pixel readout sharing scheme (e.g., non-shared, 2×2 sharing, 2×4 sharing) could be used.

Similarly, the disclosure refers to N-Channel Metal-Oxide Silicon (NMOS) transistors (sometimes merely NMOS), used as switching devices; in alternative embodiments, any other suitable active semiconductor elements may be used.

FIG. 1 is a block diagram that schematically illustrates an imaging device 100, in accordance with an embodiment that is described herein. The imaging device comprises a pixel circuit 102 and a readout circuit 104. In embodiments, imaging device 100 comprises a plurality of pixel circuits, arranged in a matrix, comprising intersecting rows and columns.

According to the example embodiment illustrated in FIG. 1, imaging device 100 comprises two integrated circuits, interconnected by a plurality of wafer-to-wafer bonds 106. In embodiments, a first integrated circuit, which comprises the pixel circuits, is fabricated using a semiconductor technology that is optimized for light accumulation in photodiodes, whereas the semiconductor technology of the second integrated circuit, comprising the readout circuits, is optimized for high density capacitors, e.g., Metal-Insulator-Metal (MIM).

Each pixel circuit 102 comprises four PDs 108 that are coupled by NMOS transistors 110 to a floating diffusion (FD) 112, a reset NMOS 114 that is coupled between a VPIX supply (typically 2.8V) and the FD, and a source follower amplifier (SF) 116, comprising a NMOS transistor, that couples the FD to the wafer-to-wafer bonds.

According to the example embodiment illustrated in FIG. 1, pixel circuit 102 comprises four PDs. In other embodiments, any other suitable number of PDs may be used, e.g., 1, 2 or 8. In some embodiments, each (or some) of the PDs may be a split PD (used, for example, in auto-focus applications).

To support high dynamic range, the charges accumulated on PDs 108 are partially drained in multiple iterations during the exposure time, preventing PD well overflow. In each iteration: (i) NMOS 114 resets FD 106; (ii) SF 116 transfers a replica of the reset voltage that is stored on the FD ("reset voltage"), through wafer-to-wafer bond 106, to readout circuit 104; (iii) a selected one of NMOS transistors 110 transfers portion of the charge from the well of the selected PD to FD 112; and (iv) SF 116 transfers a replica of the voltage on the FD ("signal voltage", roughly proportional to the charge transferred from the PD), through the wafer-to-wafer bond, to the readout circuit. In embodiments, the portion of the charge in the PD well that NMOS 110 transistors transfer is controlled by the voltage applied to the NMOS gate.

Readout circuit 104 is configured to average the multiple reset and signal voltages that SF 116 sends. The readout circuit comprises a store-NMOS 118 that selects one of the pixel circuits, a biasing NMOS 120 that generates a bias load current (typically between 1 uA-4 uA) to SF 116, and a sample-group NMOS 122 that connects the shared pixel output line to the averaging circuitry (described below).

To average the voltage (reset voltage and signal voltage) transferred from the pixel circuit, the voltage is first applied to a variable-capacitance circuit 124, and then the variable capacitance circuit is coupled to a $C_{rst}$ capacitor 128 through an NMOS switch 130 (for reset voltage averaging), or to $C_{sig}$ capacitor 132 through an NMOS switch 134 (for signal voltage averaging). The capacitance of the variable capacitance circuit is set such that in each iteration the new voltage will be averaged with the running average stored in $C_{rst}$ or $C_{sig}$. For example, for the $n^{th}$ iteration, since the voltage on $C_{sig}$ is the average of n−1 sampled signal voltages, the variable capacitor will be set to 1/(n−1) of the capacitance of $C_{sig}$.

After the last iteration, a buffer, comprising a PMOS buffer 136 and a PMOS select switch 138, serially outputs the voltages on $C_{sig}$ 132 and $C_{rst}$ 128, typically to an analog-to-digital (ADC) converter (not shown). In some embodiments, after the last iteration, the pixel-circuit, in a final read operation, sends the full remaining charge on the PD well and the corresponding reset voltage to the readout circuit, which then outputs the voltages (e.g., to an ADC).

It should be noted that, during the averaging process described above, sample-group NMOS 122 is off, isolating the averaging and storage capacitors from bias transistor 120 and from the capacitance of NMOS transistors 118 and the associated metal and diffusion capacitances.

Lastly, a pixel-control circuit 140 is configured to control the pixel circuit, including driving NMOS transistors 110, and 114. Similarly, a readout control circuit 142 is configured to control readout circuit 104, including driving all NMOS transistors therein.

In some embodiments, Sample-Group NMOS 122 is not used. This adds parasitic capacitance to the capacitors of readout circuit 104 but reduces size and simplifies the control but requires turning off the BIAS transistor 120 during the capacitor averaging step. In addition, when NMOS 122 is not used, one of the shared vertical metal routes can be eliminated, easing the routing in a relatively congested area.

The configuration of imaging device 100, illustrated in FIG. 1 and described hereinabove is cited by way of example. Other configurations may be used in alternative embodiments. For example, in embodiments, both the pixel circuit and the readout are in the same integrated circuit; in some embodiments, two integrated circuits are used, but NMOS 118 is in the first integrated circuit. In embodiments, different multiplexing schemes may be used.

Figure 2:
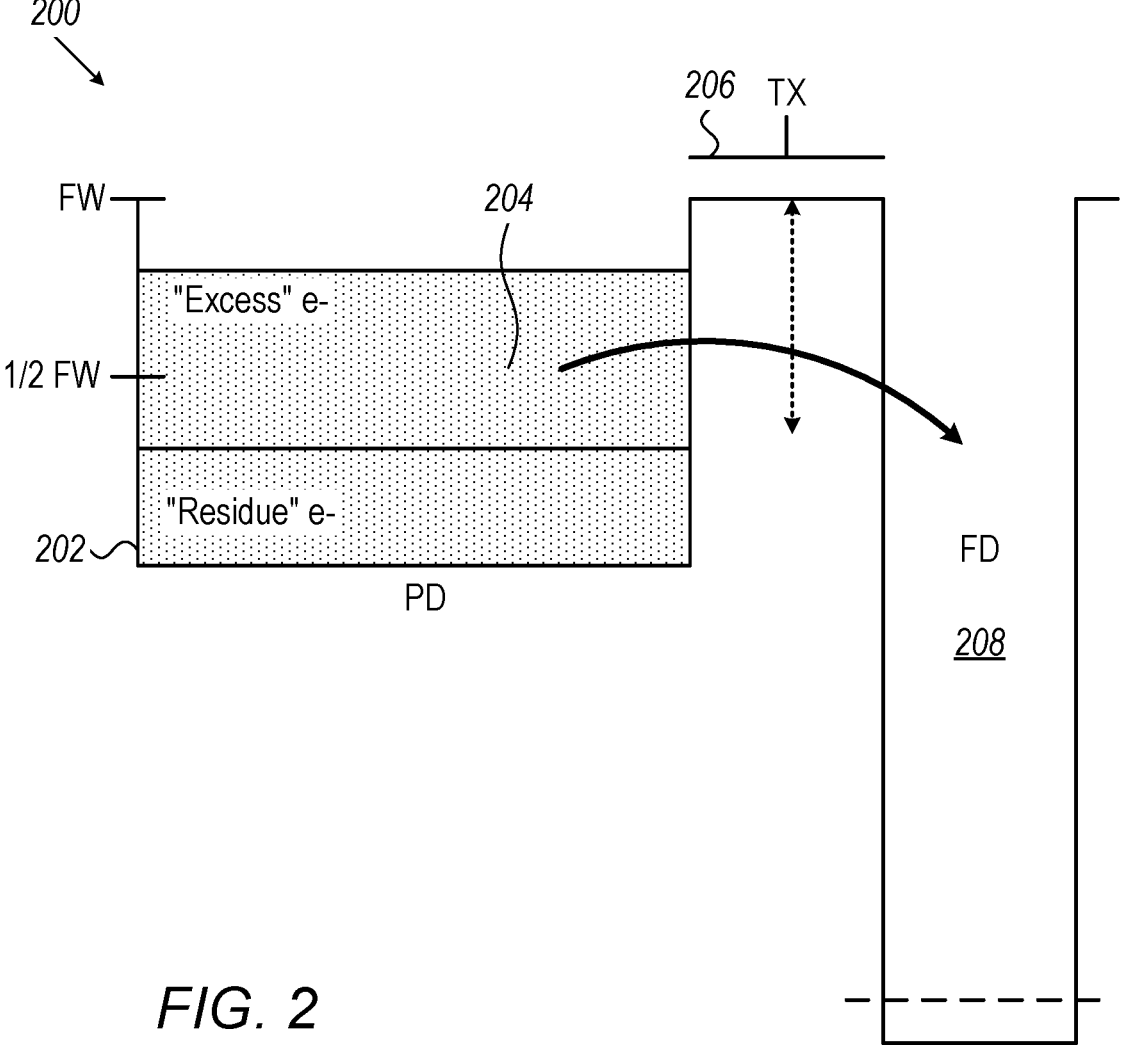
FIG. 2 is a voltage level and charge capacity diagram that schematically illustrates partial charge transfer in a pixel circuit, in accordance with an embodiment that is disclosed herein.

FIG. 2 is a voltage level and charge capacity diagram that schematically illustrates partial charge transfer in a pixel circuit 200, in accordance with an embodiment that is disclosed herein. The vertical axis in FIG. 2 is negative voltage—that is, higher points along the y axis represent more electrons and, hence, lower voltage.

A PD 202 has been exposed to incident light and, consequently, accumulated electric charge 204. An NMOS 206 is configured to periodically remove excess charge from PD 202 so that the charge does not exceed the pixel full well level (FW). The voltage applied to NMOS 206 gate is set so that a charge roughly equals to FW/4 to FW/2 will remain in the PD well (if the accumulated charge is less than this value, no charge will be removed). In embodiments, the voltage applied to NMOS 206 gate is roughly equal to the photodiode voltage associated with FW/2+Vth, where Vth is the threshold voltage of NMOS 206. In practice, the amount of charge remaining in the photodiode in not linearly proportional to the voltage under the transfer gate, and device simulations (e.g., "TCAD") are used to determine the best range of transfer gate voltages to achieve partial charge transfer.

The charge that NMOS 206 removes from the well is temporarily stored in FD 208, which is initially reset by reset NMOS 114 (FIG. 1).

In a final read operation, a full range voltage is applied to the gate of NMOS 206, to transfer any remaining charge from the well to the FD.

It should be noted that, since the charge removal (and subsequent averaging) operation repeats, this method is not sensitive to the exact depth of charge extraction from PD; moreover, the depth of the charge removal may vary from pixel to pixel. Also, the initial reset pulse need not set FD to a fixed amount of charge but rather uncertainty/noise in the amount of charge (indicated by a dashed line, caused by thermal "kTC" noise) may remain and will be compensated for by correlated double sampling (that is—averaging the reset level and subtracting the average from the signal average).

In embodiments, the partial-sampling Tx transfer pulse height may vary; a high Transfer gate nominal pulse voltage value to allow 0.25*LFW charge to remain in the PD allows some margin for most pixels for variation of TX barrier height and Tx voltage circuit variations. In Some embodiments, other nominal pulse heights may be used, to allow 0.25 or 0.5 LFW. In general, the allowed maximum residue charge is set responsively to the conversion gain used in the pixel to keep the read noise low for the capacitor circuit readout.

Figure 3:
FIG. 3 is a block diagram that schematically illustrates a readout circuit, in accordance with an embodiment that is described herein.

FIG. 3 is a block diagram that schematically illustrates a readout circuit 300, in accordance with an embodiment that is described herein. The readout circuit comprises S&H pairs 302 to store average values of the reset and signal read from the pixel-circuit, an averaging capacitance circuit 304, a control circuit 306, a sample-group NMOS 308, a floating diffusion (FD2) node 309 and an output buffer 310 that outputs the voltage on FD2, e.g., to an ADC.

Readout circuit 300 is configured to average the reset and signal voltages that the pixel circuit sends, and to output the average signal and reset voltages. In addition, readout circuit 300 is configured to output the non-averaged reset and signal voltages from the final read operation.

The readout circuit comprises an S&H pair 302 for every PD in the corresponding pixel circuit, to store the average values of the respective reset and signal voltages. Each S&H pair comprises a reset-store capacitor 312 and a signal store capacitor 314, that are coupled to FD2 through, respectively, an NMOS 316 and an NMOS 318. In embodiments, the number of S&H pairs 302 in readout circuit 300 is equal to the number of photodiodes in the corresponding pixel circuit.

Averaging capacitance circuit 304 comprises a plurality of capacitors 320 that are coupled through NMOS transistors 322 to FD2. In some embodiments, the number of capacitors 320 and the number of corresponding NMOS transistors 322 is equal to the maximum number of iterations in which the PDs of the corresponding pixel circuit are partially sampled.

Except in the first iteration and in the final readout, the voltage that NMOS 308 transfers to FD2 is first coupled to a capacitor 320 of variable capacitance circuit 304 through a respective NMOS 322, and then coupled to one of storage capacitors 312 or 314 (through FD2, an NMOS device 322 and an NMOS device 316 or 318). The capacitance of the variable capacitance circuit in each iteration is set so that, when coupled to the storage capacitor, the common voltage will be the accumulated average of all samples. For example, in the $n^{th}$ iteration, the storage capacitor's voltage is the average of the previous $n-1$ voltages; variable capacitance 304 will, therefore, be set to approximately $1/n$ time the capacitance of the storage capacitor (design considerations and tweaks will be discussed below).

Control circuit 306 is configured to control the readout circuit, driving the gates of NMOS transistors 316, 318, 322 and 308 at suitable timing patterns (example timing patterns will be described below, with reference to FIG. 5).

Since the exact sizes of the capacitors and the resulting weights may not be achievable, the weight for a particular sample can be fine-tuned by changing the integration time for the partial pixel sample. For example, if a capacitor is 10% too large, the partial pixel sample integration time may be reduced by 10% to compensate, and by modifying the integration time of earlier samples. In embodiments, the capacitor mismatch is characterized during the silicon prototyping phase to adjust this fine tuning; in other embodiments fine-tune calibration is done during device test, individually for each image sensing device.

In some embodiments similar compensation is used for dielectric relaxation that is common for high density capacitors and would apply to the storage capacitor that is holding the signal charge for a relatively long period of time. The dielectric relaxation tends to weight earlier samples higher than later samples, and this is compensated for by changing the integration time for the sample to fine tune the weight.

Thus, readout circuit 300 averages the reset and signal voltages that the pixel circuit sends, stores and outputs the averages, e.g., to an ADC. The readout circuit further outputs the reset and signal voltages of the final readout operation, to be added to the respective average voltages.

The configuration of readout circuit 300, illustrated in FIG. 3 and described hereinabove, is cited by way of example. Other configurations may be used in alternative embodiments. For example, in some embodiment, two storage capacitors are used for each of the reset and signal voltages; the first 16 samples (assuming a total of 32 samples) are averaged into the first capacitor, whereas the last 16 sample are averaged into the second capacitor. The average will then be the average of the voltages in the two capacitors. This scheme may reduce the number of capacitors in variable capacitance circuit 304.

Readout Circuit Design Considerations and Tweaks

The following table lists the capacitances of variable capacitance circuit 304, in 18 iterations, assuming MIM process technology, featuring 300 fF/μm², and assuming that the capacitance of storage capacitors 312, 314 is 120 fF:

| Sample number | Averaging cap size (fF) | Weight for all samples at end of S# | Cap Area (um2) | Square capacitor side dimension (nm) | Cap mismatch (%) |
|---|---|---|---|---|---|
| 1 | 120(*) | 1.0 | 0.4000 | 632 | 0.15811 |
| 2 | 120 | 0.5 | 0.4000 | 632 | 0.22361 |
| 3 | 60 | 0.333 | 0.2000 | 447 | 0.27386 |
| 4 | 40 | 0.25 | 0.1333 | 365 | 0.31623 |
| 5 | 30.00 | 0.200 | 0.1000 | 316 | 0.35355 |
| 6 | 24.00 | 0.167 | 0.0800 | 283 | 0.38730 |
| 7 | 20.00 | 0.143 | 0.0667 | 258 | 0.41833 |
| 8 | 17.14 | 0.125 | 0.0571 | 239 | 0.44721 |
| 9 | 15.00 | 0.111 | 0.0500 | 224 | 0.47434 |
| 10 | 13.33 | 0.100 | 0.0444 | 211 | 0.50000 |
| 11 | 12.00 | 0.091 | 0.0400 | 200 | 0.52440 |
| 12 | 10.91 | 0.083 | 0.0364 | 191 | 0.54772 |
| 13 | 10.00 | 0.077 | 0.0333 | 183 | 0.57009 |
| 14 | 9.23 | 0.071 | 0.0308 | 175 | 0.59161 |
| 15 | 8.57 | 0.067 | 0.0286 | 169 | 0.61237 |
| 16 | 8.00 | 0.063 | 0.0267 | 163 | 0.63246 |
| 17 | 7.50 | 0.059 | 0.0250 | 158 | 0.65192 |
| 18 | 7.06 | 0.056 | 0.0235 | 153 | 0.67082 |

(*)in the first iteration the readout circuit transfers the voltage directly to the storage capacitor.

Random mismatch scales with the square root of the capacitor area. Overall mismatch and resulting averaging error were calculated by:

1. Determining the mismatch for each capacitor as listed in the last column of the table hereinabove.
2. Determining an averaging error resulting from the mismatch of each capacitor.
3. Determining an averaging error resulting from the mismatch between each capacitor and the other weight capacitors during the averaging.
4. Adding the individual errors above within the range of the signal being averaged together, in quadrature to determine the final averaging error.

Note that some averaging capacitors do not see any signal depending on when they reach the threshold for the partial pixel sampling circuit and would not contribute to an averaging error.

It should be noted that to calculate the exact capacitance, the capacitance of FD2 and the capacitance of the transfer gates should be considered.

In some embodiments, systematic or deterministic capacitor mismatch can be mitigated by varying the PD integration time.

In an embodiment, the number of capacitors 320 is less than the number of partial transfer iterations, and, in some iterations, two or more capacitors are switched on. For example, in the 10ᵗʰ iteration, a capacitance of $\frac{1}{10}$ of the signal-store capacitance can be achieved by concurrently switching of the capacitor of the 15ᵗʰ iteration and the capacitor of the 30ᵗʰ iteration ($\frac{1}{30}+\frac{1}{15}=\frac{1}{10}$).

Figure 4:
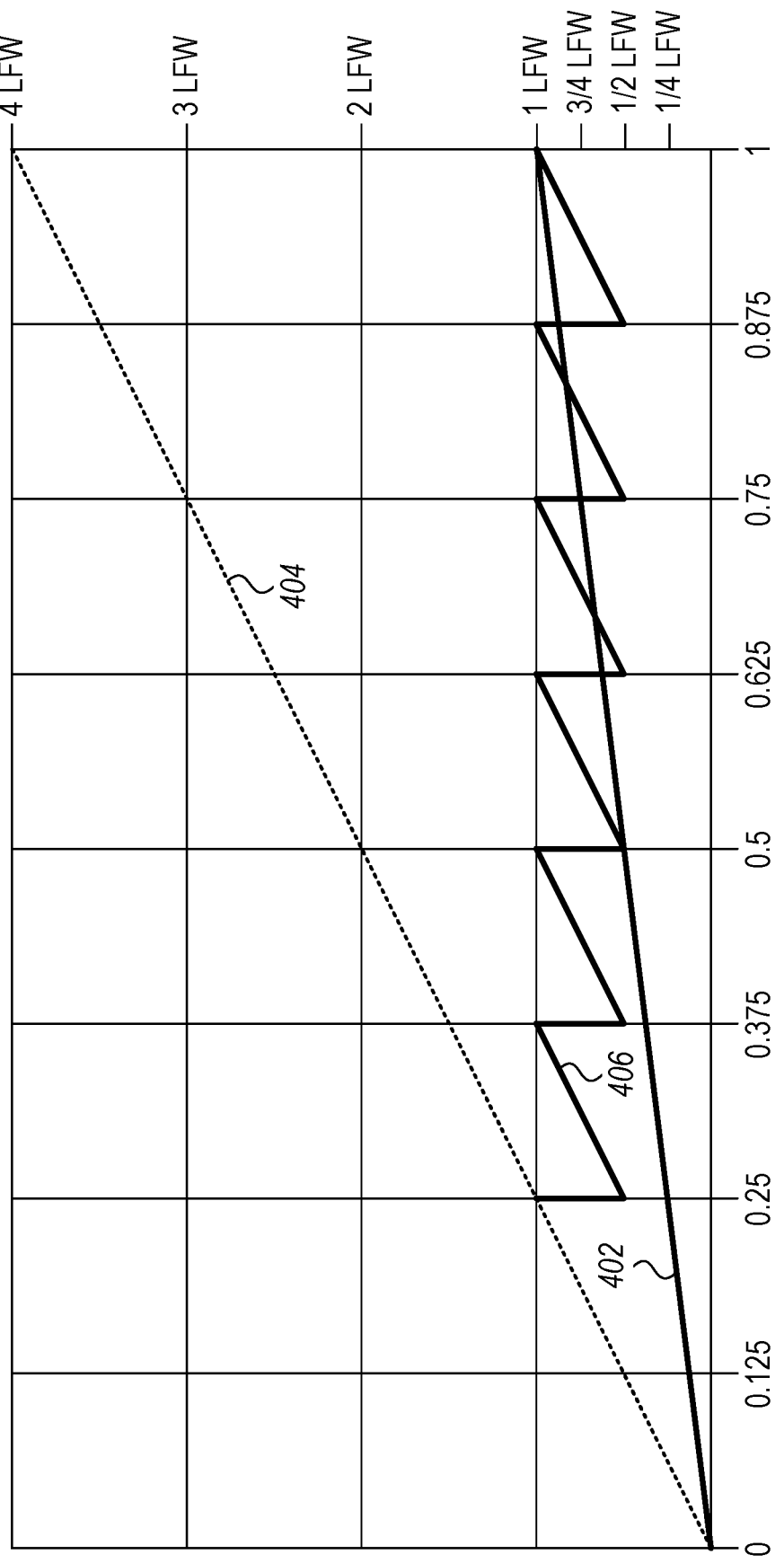
FIG. 4 is a waveform diagram that schematically illustrates partial oversampling, in accordance with an embodiment that is disclosed herein.

FIG. 4 is a waveform diagram 400 that schematically illustrates partial oversampling, in accordance with an embodiment that is disclosed herein. The horizontal axis denotes time, where 1 represents full exposure time, and the vertical axis denotes photodiode charge, in units of full-well charge, or Linear Full Well (LFW).

A graph 402 denotes the charge on the photodiode's well as a function of time, with an illumination level IL0 that fills the PD well (1 LFW) in the full exposure time. The charge grows linearly, from 0 to full well charge.

A graph 404 denotes the total charge accumulated on the photodiode's well, when the illumination level IL1 is four times more intense (IL1=4*IL0). The total accumulated charge on the PD's well now reaches an effective 4 LFW in the full exposure time and would overflow at the 1 LFW line.

A graph 406 denotes the charge on the PD's well when the illumination level is IL1. The PD's well is repeatedly partially drained, in periods of ⅛ of the full exposure time, to avoid well overflow. According to the example embodiment illustrated in FIG. 4, the PD's well is drained to half of the well capacity (½ LFW). At 0.125 of the full exposure time, the charge on the PD's well reaches ½ LFW, and, hence, the partial drain will not drain any charge. At the next ⅛ shutter time (t=0.25), however, the charge reaches 1 LFW, and half of it is drained. This partial drainage will repeat in all other periodic oversampling time points.

Figure 5:
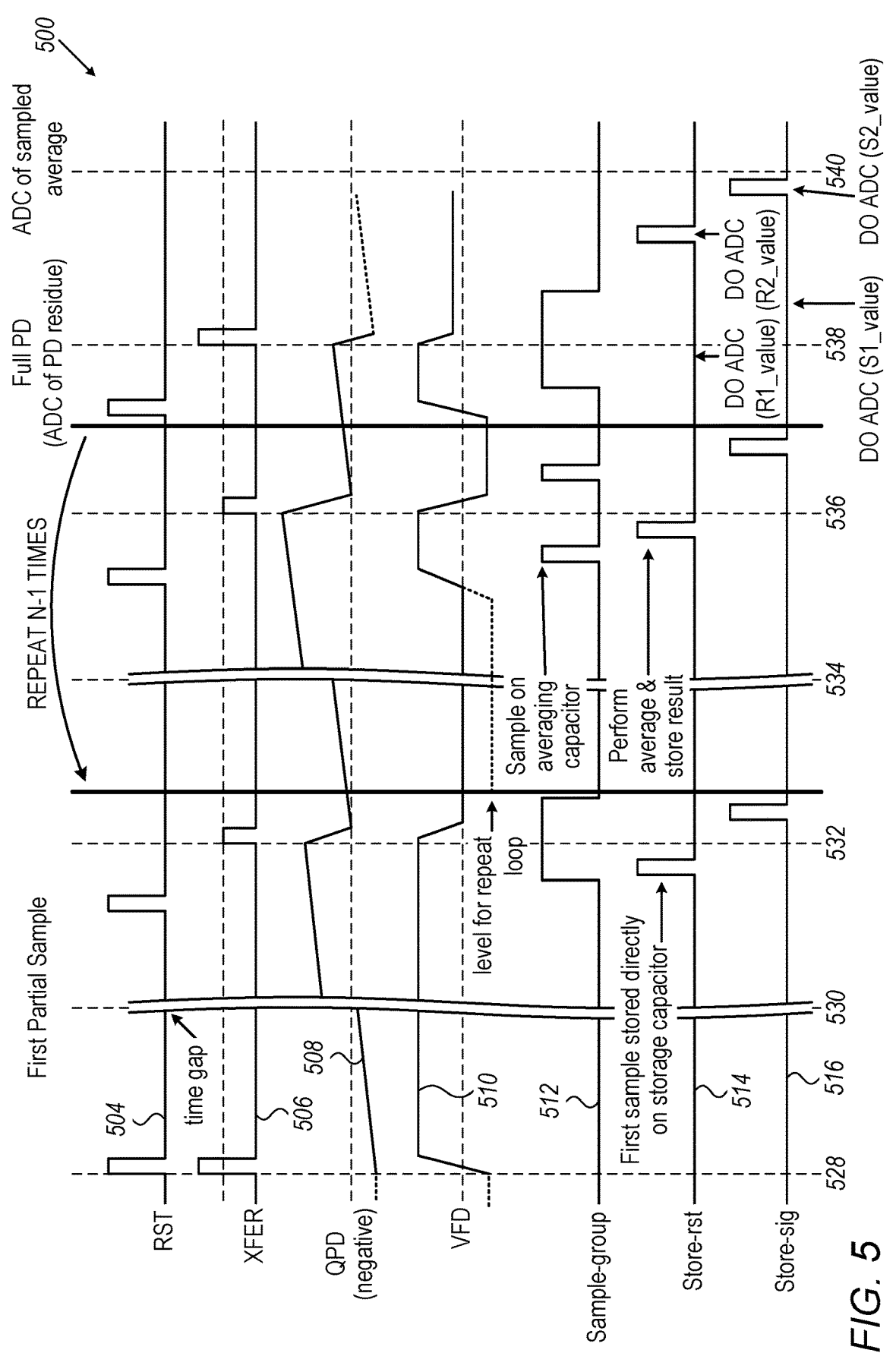
FIG. 5 is a timing diagram that schematically illustrates simplified waveforms of selected nodes in an HDR imaging device during an image capture time, in accordance with an embodiment that is described herein.

FIG. 5 is a timing diagram 500 that schematically illustrates the simplified waveforms of selected nodes in an HDR imaging device during an image capture time, in accordance with an embodiment that is described herein. The waveforms are drawn against a horizontal time axis (not shown) and comprise pixel circuit waveforms and readout circuit waveforms.

The pixel-circuit waveforms illustrate signals in pixel circuit 102 (FIG. 1) and comprise a Reset waveform 504 that illustrates NMOS 114 gate voltage, a Transfer waveform 506 that illustrates NMOS 110 gate voltage (waveform 506 reaches full voltage swing (e.g., Vdd) for full transfer of charge, and partial voltage swing for partial charge transfer), a QPD waveform 508 that illustrates the negative (i.e., amount of electrons) in the well of PD 108, and an FD waveform 510 that illustrates the voltage level on Floating Diffusion 112.

The readout circuit waveforms illustrate signals in readout circuit 300 (FIG. 3), and comprise a Sample-Group waveform 512 that illustrates the voltage on the gate of Sample-Group NMOS 308, a Store-RST waveform 514 that illustrates NMOS 316 gate voltage, and a Store-Sig waveform 516 that illustrates NMOS 318 gate voltage.

The dashed horizontal lines in FIG. 5 indicate partial voltages and charges that are associated with partial photodiode readout: a partial transfer voltage indication dashed-line depicts the voltage on NMOS transistors 110 gate; a partial QPD indication dashed-line depicts the maximum remaining charge in the photodiode; and a partial VFD indication dashed-line depicts the minimum voltage of FD 106 following partial charge transfer.

Initially, the illustrated signals are at an initial state. According to the example embodiment illustrated in FIG. 5, the initial state comprises the signal levels at the end of the image capture. In general, the initial state is set (i) according to the voltage after a readout of an image that leaves zero charge in the photodiode; or, (ii) according to a preset initial state where control signal are applied to the photodiode to remove any photodiode charge prior to capture of the next image.

Timing diagram 500 further comprises evenly spaced timepoints along the time axis, from a timepoint 528 to a timepoint 540. At timepoint 528, as shown in waveforms 504 and 506, pixel control 140 applies a full voltage swing transfer pulse and, at the same time, a reset pulse, pulling VFD high (to the reset voltage) and emptying any charge from the photodiode (see waveforms 508 and 510). When the transfer pulse ends, the photodiode starts accumulating charge (responsively to an incident light); the voltage VFD remains unchanged.

After a timepoint 530, a pulse on Sample-Group 512 transfers a replica of the VFD voltage (though SF 116) to the readout circuit, and a pulse on Store-Reset 514 stores the voltage on capacitor 312.

At a timepoint 532, Sample-Group 512 remains high, and there is a partial voltage-swing transfer pulse on waveform 506, which partially drains the charge on the PD (the PD resumes integration after Transfer 506 turns off). Then, Store-Signal 516 is pulsed, to store the FD voltage on capacitor 314.

After a timepoint 534, Reset is pulsed and, shortly thereafter, Sample Group 512 is pulsed to transfer a replica of the voltage to the variable-capacitance circuit 304, and, subsequently, a Store-Reset pulse 512 averages the voltage on the variable capacitance 304 with the voltage on the reset storage capacitor 312. Then, at a timepoint 536, there is another partial voltage-swing transfer pulse on waveform 506, which partially drains the charge on the PD; a pulse on Sample-Group 512 that transfers a replica of the voltage to the variable-capacitance circuit 304, and, subsequently, a Store-Signal pulse that averages the voltage on the variable capacitance 304 with the voltage on the signal storage capacitor 314.

At the point indicated by the arced arrow, the sequence of events that started after timepoint 532 repeats, averaging more reset and signal voltages into capacitors 312 and 314 (respectively). The number of repetitions is equal to the number of oversampling operations, minus 1 (note that the VFD voltage at the first iteration is higher than the level at the following iterations).

When the loop ends, to read the remaining PD charge, reset 504 is pulsed, followed by a Sample-Group pulse during which the analog to digital conversion of the reset voltage is derived by passing the value directly through buffer 310 to the pixel array peripheral readout circuit. Then at a timepoint 538, a full voltage swing pulse is applied on Transfer waveform 506, to completely drain the PD and, thus, pulling VFD 510 to a low voltage level. Sample-Group 512 is still on, transferring a replica of the FD voltage to the pixel array peripheral readout circuit. This time the voltage is not connected to the variable-capacitance circuit 304; instead, the average reset voltage stored on the capacitor 312 is output to the pixel array peripheral readout circuit and, with the Sample-Group switch off, the average reset voltage is completely passed to the readout with very low cross-talk corruption (typically not detectable) due to ideally minimal parasitic capacitance on the FD2 node.

Next the average signal voltage stored on capacitor 314 is output to the readout circuit.

As mentioned, the waveforms illustrated in FIG. 5 are simplified; in some embodiments, the waveforms change to decrease noise. For example, in embodiments, it may be advantageous to read out the values stored on crst and $C_{sig}$ before reading out the remaining residual charge on the PD.

In an embodiment, the averaged signal on $C_{rst}$ is read immediately after the last sample is taken, and the averaged signal on $C_{sig}$ is read immediately after the last sample is taken. This sequence keeps the parasitic capacitance associated with the vertical metal line FD2 connected to the Sample-Group switch charged up to the same sampled voltage, and lower potential changes in the average voltage value if the FD2 line were charged to a different voltage from a prior different pixel value.

The waveform diagram shown above is simplified; some signals such as sample-group, and the voltages on the averaging capacitors are not shown.

The configuration of waveform diagram 500 illustrated in FIG. 5 and described hereinabove is an example that is cited merely for the sake of conceptual clarity. Other waveforms may be used in alternative embodiments. For example, in some embodiments, after the repeat loop completes, the last integration time is zero or variable prior to readout of the pixel values. In embodiments, multiple (e.g., 4) PDs are coupled to the same SF, and additional cycles are added to oversample the wells of all PDs.

Figure 6:
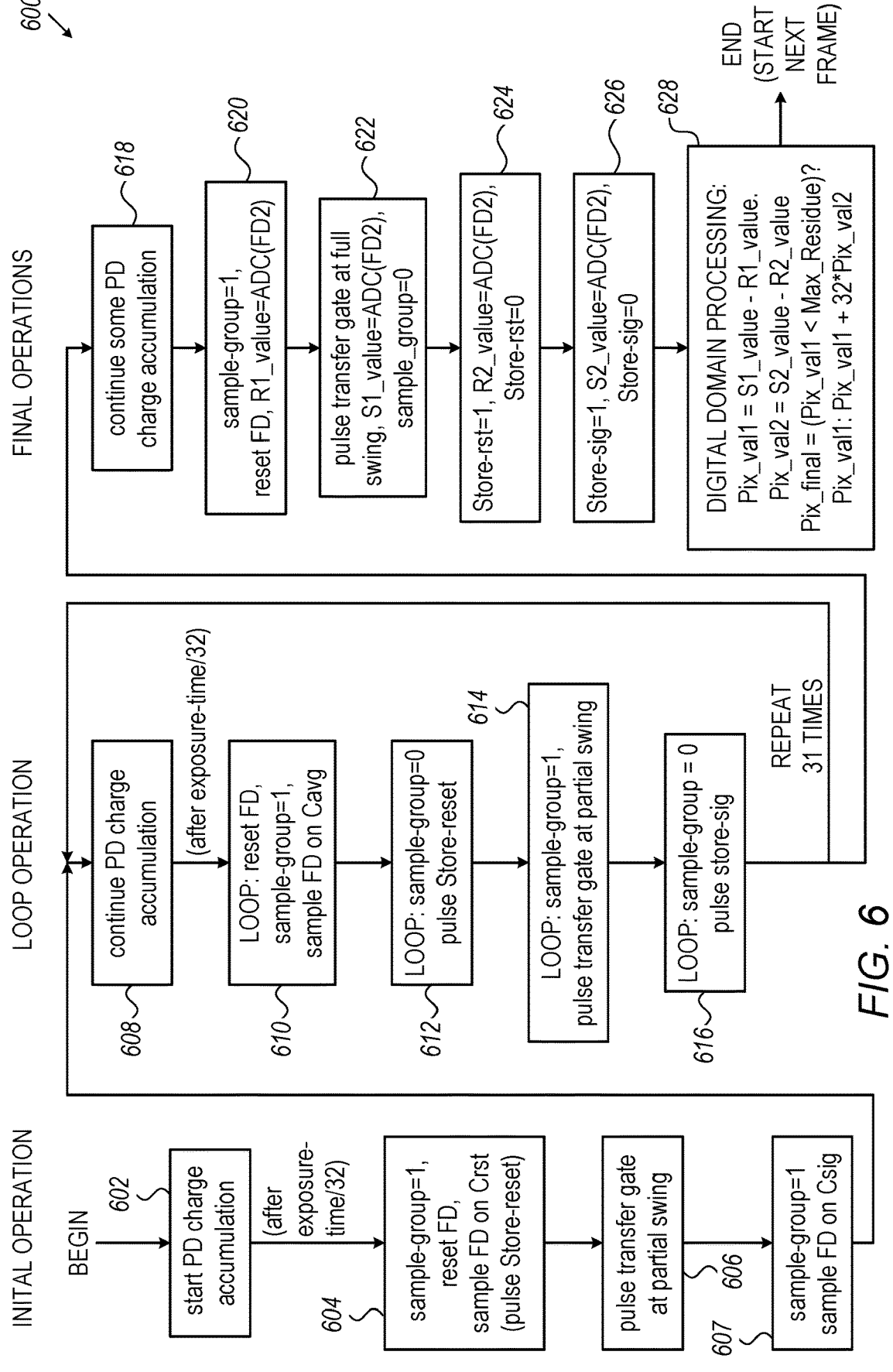
FIG. 6 is a flowchart that schematically illustrates a method for imaging device dynamic range extension, in accordance with an embodiment that is disclosed herein.

FIG. 6 is a flowchart 600 that schematically illustrates a method for imaging device dynamic range extension, in accordance with an embodiment that is disclosed herein. The method is executed by pixel control circuit 140 and readout control circuit 142 (FIG. 1), by the photodiodes, by an analog to digital converter and by digital domain circuitry (the latter two are not shown). The flowchart related to an exposure time that is divided to 32 equal "sampling periods"; the operations include initial operations that are executed once, loop operations that are executed in a loop, the number of loop iterations set according to the number of sampling periods, and final operations that are executed only once.

The flowchart starts at a Start PD Charge Accumulation operation 602, wherein PD 108 converts incident light to charge that is stored in the PD's well. When the sampling period is over, the flowchart advances to an Initial Sample-Reset operation 604, wherein the pixel-control circuit turns the sample group MOS on, resets FD 112 (FIG. 1), and then the readout control circuit stores the transferred FD voltage on $C_{rst}$.

Next, at an Initial-Partial-Sampling operation 606, the Pixel-Control circuit pulses the transfer NMOS at a partial voltage swing, to move part of the accumulated charge to the floating diffusion. The amount of charge that is removed is the part of the accumulated charge above a threshold (controlled by the voltage at the gate of the transfer NMOS); if the accumulated charge is less than the threshold, no charge will be transferred.

Next, at a Sample FD operation 607, the Pixel-Control circuit pulses Sample-Group, and the readout circuit samples a replica of FD on capacitor $C_{sig}$.

At a Continue-Accumulation operation 608, the PD continues charge accumulation until the current sampling period completes, and then enters a Loop-Sample-Reset operation 610, wherein the pixel-control circuit resets the FD and turns sample-group NMOS on, and the readout control circuit samples FD on $C_{avg}$.

Then, at a Loop-Store-Reset operation 612, the pixel control circuit turns the sample-group NMOS off, and the readout control circuit turns the store-reset NMOS on, thus, adding the current Reset voltage to the running average that is stored in $C_{rst}$.

The flowchart now enters a Loop-Partial-Sampling operation 614, wherein the Pixel-Control circuit pulses the transfer NMOS at a partial voltage swing, to move part of the accumulated charge to the floating diffusion; and at a Loop-Store-Signal operation 616, the pixel control circuit turns sample-group NMOS off and the readout control circuit pulses the Store-sig NMOS, to add the voltage on $C_{avg}$ to the running average store on $C_{sig}$.

Operations 608 through 616 repeat 31 times, averaging 32 reset voltages (the initial operation (outside the loop) captures the first reset and signal voltages) into $C_{rst}$ and 32 signal voltages into $C_{sig}$. After the last execution of operation 616, the flowchart moves to a Continue Some—Charge-Accumulation operation 618, wherein the photodiode continues to accumulate charge until the last sampling period completes, and then moves to an ADC-Final-Reset operation 620, wherein the pixel control circuit resets the FD and turn the group-select NMOS on, and an ADC converts the reset signal to an analog value, referred to as R1_value.

Next, in a Full-Swing-Charge-Transfer operation 622, the pixel control circuit applies a full voltage swing at the gate of the transfer NMOS, to move all remaining charge from the PD to the FD, and a replica of the FD voltage to the readout circuit (the group-select NMOS is still on). The FD voltage is ADC converted; the digital value is referred to as S1_value. After the conversion, the pixel control circuit turns the sample group NMOS off.

Now, at an ADC-Store-Reset operation 624, the readout control circuit pulses Store-reset NMOS and, when the pulse is on, the ADC converts the voltage on $C_{rst}$ to digital (referred to as "R2_value"). Next, at an ADC-Store-Signal operation 626, the readout control circuit pulses Store-sig NMOS and, when the pulse is on, the ADC converts the voltage on $C_{sig}$ to digital (referred to as "S2_value").

Lastly, in Digital-Domain-Processing operation 628, digital processor calculates the final value responsively to R1_value, R2_value, S1_value and S2_value. If the correlated value of the non-over-sampled PD readout—Pix_val1=S1 value-R1_value, is below a preset threshold, the partial readouts are assumed to have zero signal, and, to avoid adding noise from Pix_val2, the pixel value is set to Pix_val1. If Pix_val1 is above the threshold, the final value is set by adding the correlated averaged pixel value Pix-val2=S2_value-R2 value, multiplied by 32, to pix_val1.

The configuration of flowchart 600 illustrated in FIG. 6 and described herein above, is cited by way of example. Other configurations may be used in alternative embodiments. For example, in some embodiments, operation 618 may be skipped and the remaining photodiode charge can be readout immediately after the final partial sample is taken. Otherwise, the pixel could be allowed to accumulate charge for additional time as long as it does not exceed the time where the pixel is expected to overflow or where it exceeds the ADC operating input voltage range.

Design Considerations

The increase in dynamic range versus a conventional single pixel read described hereinabove is achieved by capturing signal that normally would be lost and is achieved because the minimal detectable signal is lower through the reduced read noise possible with this circuit.

To minimize circuit noise for the sampling circuit and to support small pixels, high density capacitors are needed. In embodiments, Metal-Insulator-Metal (MIM) capacitors with up to 300 fF/μm2 are used. The design can tradeoff dynamic range extension set by the oversampling count against the value of capacitors used in the readout circuit.

The amount of dynamic range extension beyond a conventional pixel photodiode readout is determined responsively to the amount of the linear full well (LFW) that is transferred to the FD in each partial sampling. For example, if one half of the LFW is read out in a partial sampling and one half of the LFW remains for final readout, the maximum signal that can be captured is:

$$\text{Maximum signal} =$$

$$(1/2 \; LFW) \times (\text{sample\_count} - 1) + (1/2 \; LFW) = \text{sample\_count} \times LFW$$

E.g., for a 32× sampling rate, the maximum signal that can be captured is 16×LFW. Thus, the dynamic range of the sensor is increased by 20× log(15)=23.5 dB beyond a conventional single exposure readout that captures a LFW maximum signal.

Since, in the example described above, only ½ of the signal is captured during a pixel read, the conversion gain of the pixel or the analog gain of the pixel readout can be increased by a factor of 2 and, accordingly, the read noise can be reduced by 50%. This reduction in read noise also boosts the dynamic range by as much as 6 dB. Thus, at a 32× oversampling count, a 23.5 dB+6 dB=29.5 dB increase in dynamic range is possible.

The additional noise of the sampling circuit during the partial sampling is determined by the kTC noise of the capacitors and the pixel source follower thermal noise. Since the averaging steps help reduce noise, the read noise asymptotically approaches the same read noise of single sampling of the storage capacitor. For example, for a 120 fF storage capacitor, the noise is about 188 μV after ten samples and 186 μV (kTC noise limit) after 32 samples. Note that this noise is multiplied by the sample count (e.g., 32×) during digital reconstruction of the signal.

To minimize the additional read noise from the storage capacitors, a high conversion gain pixel reduces the floating diffusion referred noise from the voltage mode storage circuit. This noise reduction, in turn, reduces the SNR dip when going from low light to higher light conditions (it does not impact low light because the averaging circuit value is not used in pixel reconstruction). However, with much higher conversion gain, the maximum amount of charge residue in the photodiode is reduced to avoid going beyond the maximum allowed signal for the signal chain. Assuming the capacitor readout has the same maximum allowed signal, the dynamic range is determined by the sample count times this reduced maximum charge.

Another critical feature is the use of slew-rate controlled gate switching for the sampling switches to make sure charge sharing between the averaging capacitor and storage capacitor is done in proportion to the capacitor sizes. Also, the switch and capacitor sizing are chosen to minimize parasitic capacitance feedthrough when the sample-group NMOS turns off. This non-ideality results in photo-response non-uniformity (PRNU) (i.e., overall pixel value mismatch across the pixel array after reconstruction) that can limit the image quality if not properly designed (e.g., by minimizing unwanted capacitive coupling from the switch to the averaging capacitor).

It should also be noted that capacitor mismatch can impact PRNU if capacitor sizing is not correctly chosen. For example, a 0.1%-μm capacitor size mismatch results in 0.85% PNRU that is higher than a typical target of 0.5%. In an embodiment, the capacitor mismatch is limited to 0.06%-μm, and the PRNU goal is met.

In addition to increasing the dynamic range of the sensor, this capture technique also increases the maximum possible signal to noise ratio (SNR) of the imaging device. This increase occurs because the effective amount of charge captured is higher using sampling and averaging as described hereinabove.

The array of capacitors for creating the variable capacitance used in the averaging operation is shared with multiple pixels, wherein there is a dedicated set of sample capacitors for each photodiode. The sharing is done by time multiplexing the averaging operation for the set of pixels sharing the capacitor array. The sharing scheme makes this idea possible with small pixels where there is limited area; in embodiments, the sharing is done with 32 shared pixels.

The HDR circuit for doing the averaging operation can be attached to any pixel to extend the native dynamic range.

Figure 7:
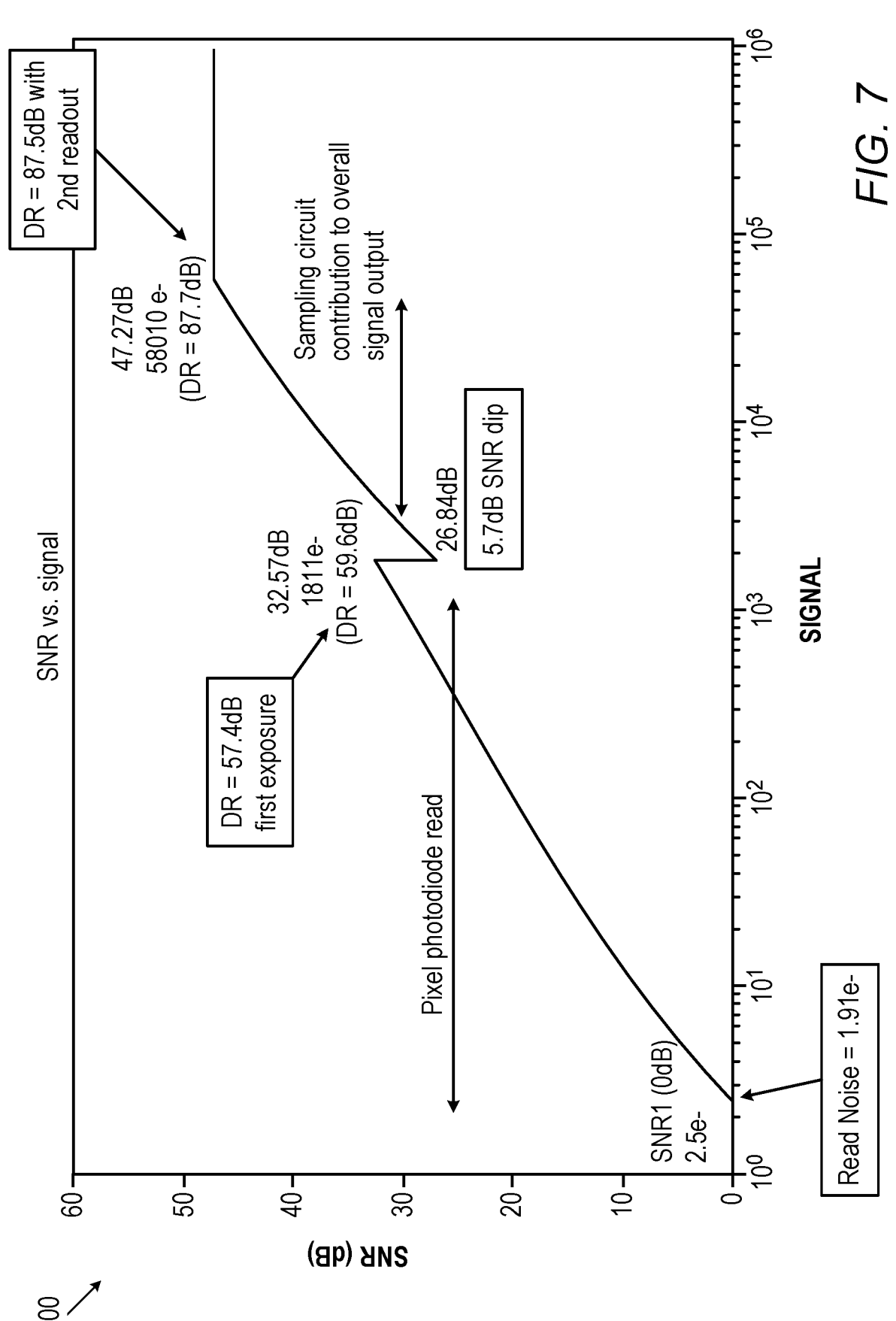
FIG. 7 is a Signal-to-Noise Ratio (SNR) chart that schematically illustrates SNR as a function of signal level, in accordance with an embodiment that is disclosed herein.

FIG. 7 is a Signal-to-Noise (SNR) chart 700 that schematically illustrates the SNR as a function of the signal, in accordance with an embodiment that is disclosed herein. The SNR curve has two contiguous segment—a low-signal level segment, wherein only the last non-oversampled signal is used, and a high signal level segment, wherein the digital circuitry sums the last non-oversampled signal with the average of the previous oversampled signals (multiplied by the number of samples). The SNR, which rises along the high signal level segment, drops slightly at the start of the high signal-level segment and then continues to rise until the maximum signal level is reached.

We assume for the SNR curve an example readout scheme using these parameters:

CDS on CDS on full pixel PD read, 1.0× gain, 225 uV/e–
    conversion gain (cg), 10 bits ADC
  CDS on final stored partial pixel sample average, 32×
    Over sampling Rate (OSR), 1.0× gain, 225 uV/e– cg,
    10 bits
  120 fF sampling capacitor
  Other points that should be noted:
  In the first readout for the full PD read:
    the gain is 1.00 and the LSB size is 1.77 e–
  The two components of the overall pixel read noise are the
    column ADC noise and the pixel buffer transistor read
    noise. These are listed below:
    the column read noise electrons referred to FD is 1.29
      e– (single sample read)
    pixel read noise electrons at FD is 0.38 e– (single
      sample read)
    the total CDS read noise electrons referred to FD is
      1.91 e– (after digital CDS)
  In the second readout:
    the gain is 1.00 and LSB size is 1.77 e–
    the column read noise electrons referred to the FD is
      1.91 e– (after digital CDS).
    the pixel read noise electrons at the FD is 1.2 e– (after
      digital CDS)
  The total CDS read noise electrons referred to the FD is
    72 e– (this pixel read noise is for the partial pixel
    sample circuit after multiplying by 32 (total samples
    taken)).

Other Use Cases of the Present Disclosure

There are other use cases of the present disclosure:

1. Creating a blur in high lighting conditions. This feature avoids "jittery" video artifacts in high illumination conditions like outdoors. The disclosed circuitry sparsely samples a plurality of short exposures of the pixel with full photodiode charge sampling and average these short exposures over the entire frame time. The short exposures may be spread out during the frame time and not taken necessarily one after the other. This technique simulates different shutter angle settings with multiple averaged captures of the image.
2. Kernel Operations. For various image processing algorithm, a kernel operation is performed, wherein a weighted average of a pixel and it neighbors is calculated. The averaging techniques disclosed above can be used to execute such kernel operations.
3. Electronic camera stabilization. With the addition of NMOS devices to shift voltages from the pixel circuit to the readout circuit on the left, right, top or bottom of the readout circuit that corresponds to the pixel circuit, it is possible to electronically stabilize the camera at the pixel level, by targeting storage of a pixel at a fixed position regardless of camera motion.
4. Excess-charge indication. In some embodiments, an additional averaging capacitor can be used to store a flag that indicates whether a particular photodiode has excess charge from high illumination. This information can be used to reduce the number of pixels reads and thus power. This step would work by performing an additional weighted average of the full pixel read during readout of that full pixel value. If the flag is set with a high voltage to indicate high illumination for the pixel, then this new weighted average is sent to the ADC; otherwise, the full pixel read value (for reset and for signal level) is sent to the ADC. Additional local circuitry would be used with the flag to enable this conditional selection for the readout.
5. Reduced shutter angle. In some embodiments, the electrical charge accumulated in the PDs is transferred to the pixel circuit and averaged in all iterations including the last iteration; the pixel output is the ADC conversion of the voltages on the storage capacitors. In other embodiments, all the PD charge is transferred in each iteration, wherein the accumulation iterations are spaced out in time with non-integration time in between, and only the storage capacitors are read out to the ADC.
6. Binning. Summing of charge from multiple photodiodes on the FD and using the additional storage capacitors that are not used to store the final pixel binned signal. This feature allows global shutter operation along with high dynamic range but at the reduced resolution of the binned photodiodes.
7. Configurable dynamic range. In some embodiments the readout circuit can vary the number of iterations (iteration count), and in this manner adapt the pixel dynamic range. The adaptation may depend on any suitable factor, e.g., on the brightness of the scene.

The configuration of HDR imaging device 100, including pixel circuit 102 and readout circuit 104 and all subunits thereof, as well as flowchart 600 and waveform 500, and SNR chart 700 are example configurations waveforms and SNR charts that are shown purely for the sake of conceptual clarity. Any other suitable configurations, waveforms and SNR charts can be used in alternative embodiments, including, for example, single wafer circuits, circuits that do not include analog to digital conversions, and others.

Although the embodiments described herein mainly address partially oversampled imaging devices for high dynamic range operation, the techniques described herein can also be used in other applications, such as in those requiring a high dynamic range global shutter pixels by adding additional storage for the final full pixel PD read. Global shutter pixel capture a scene on the pixel array at one instant or very close in time and can be used to reduce motion distortion in a scene.

Figure 8:
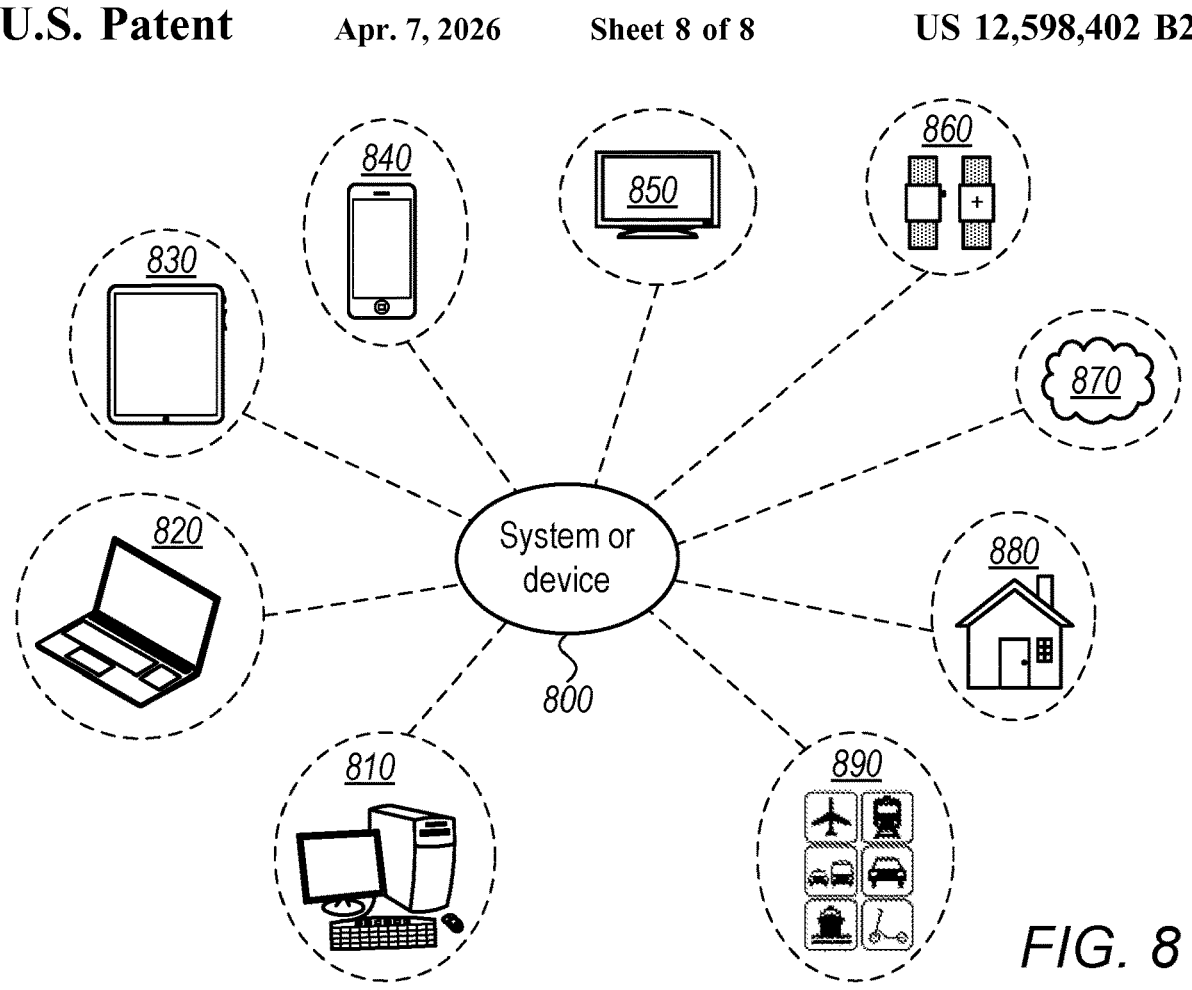
FIG. 8 is a diagram that schematically illustrates various types of systems that may include any of the circuits, devices, or system discussed above, in accordance with embodiments that are described herein.

FIG. 8 is a diagram 800 that schematically illustrates various types of systems that may include any of the circuits, devices, or system discussed above, in accordance with embodiments that are described herein. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions, for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 9:
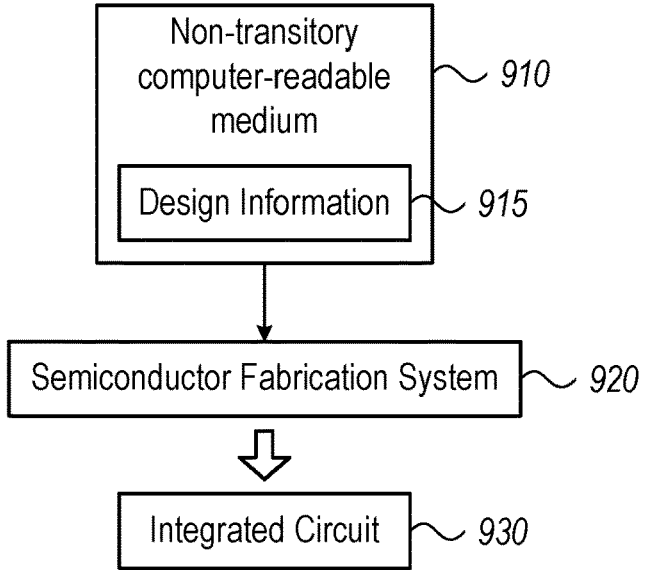
FIG. 9 is a block diagram illustrating an example non-transitory computer-readable storage medium that stores circuit design information, according to some embodiments that are described herein.

FIG. 9 is a block diagram illustrating an example non-transitory computer-readable storage medium that stores circuit design information, according to some embodiments that are described herein. In the illustrated embodiment semiconductor fabrication system 920 is configured to process the design information 915 stored on non-transitory computer-readable medium 910 and fabricate integrated circuit 930 based on the design information 915.

Non-transitory computer-readable storage medium 910, may include any of various appropriate types of memory devices or storage devices. Non-transitory computer-readable storage medium 910 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Non-transitory computer-readable storage medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system 920. In some embodiments, design information 915 may also include one or more cell libraries which specify the synthesis, layout, or both of integrated circuit 930. In some embodiments, the design information is specified in whole or in part in the form of a netlist that specifies cell library elements and their connectivity. Design information 915, taken alone, may or may not include sufficient information for fabrication of a corresponding integrated circuit. For example, design information 915 may specify the circuit elements to be fabricated but not their physical layout. In this case, design information 915 may need to be combined with layout information to actually fabricate the specified circuitry.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown in FIGS. 1 through 11. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory, programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An imaging device, comprising:
a pixel-circuit comprising a photodetector, the photodetector configured to accumulate electrical charge in response to incident light; and
a readout circuit, configured to:
perform a series of iterations, each iteration comprising (i) accumulating an electrical charge in the photodetector during an integration time, (ii) transferring a portion of the electrical charge accumulated in the photodetector to a floating diffusion, the portion being less than all the electrical charge accumulated in the photodetector, and (iii) coupling a voltage of the floating diffusion to a storage capacitance;
subsequently, in a final iteration, transfer a remaining electrical charge from the photodetector; and
derive an output digital value, indicative of a total energy of the light incident on the photodetector over the series of iterations and the final iteration, from the voltage on the storage capacitance and from the remaining electrical charge transferred in the final iteration,
wherein the readout circuit is configured to couple the voltage of the floating diffusion to the storage capacitance via a variable capacitance, and to vary a capacitance of the variable capacitance across the series of iterations, thereby coupling to the storage capacitance a weighted average of voltages of the floating diffusion from the iterations.

2. The imaging device according to claim 1, wherein the readout circuit is further configured to vary the integration time between at least two of the iterations.

3. The imaging device according to claim 1, wherein the readout circuit is configured to couple the variable capacitance to the storage capacitance by applying a controlled slew-rate signal to a gate of a transistor.

4. The imaging device according to claim 1, wherein the variable capacitance is shared with at least one other pixel circuit.

5. The imaging device according to claim 1, wherein the pixel circuit further comprises a reset device configured to reset the floating diffusion, and wherein the readout circuit is further configured to couple the voltage of the floating diffusion via the variable capacitance to a reset storage capacitance.

6. The imaging device according to claim 5, wherein the readout circuit is further configured to derive the output digital value from a difference between the voltage on the storage capacitance and the voltage on the reset storage capacitance.

7. The imaging device according to claim 1, wherein the pixel circuit further comprises a transistor, configured to transfer the portion of the electrical charge to the floating diffusion responsively to a voltage applied to a control terminal of the transistor.

8. The imaging device according to claim 1, wherein the readout circuit is configured to couple the voltage of the floating diffusion to one or more other storage capacitances, to compensate for movement of the imaging device.

9. The imaging device according to claim 1, wherein the readout circuit is configured to couple voltages of a plurality of floating diffusions to the storage capacitance, thereby weight-averaging electrical charges from a plurality of photodetectors to produce a kernel operation.

10. The imaging device according to claim 1, wherein the readout circuit is configured to couple voltages of a set of floating diffusions corresponding to neighboring pixel circuits, thereby producing a reduced resolution image.

11. The imaging device according to claim 1, wherein the readout circuit is further configured to sparsely sample the photodetector, thereby blurring high illumination image portions.

12. The imaging device according to claim 1, wherein the readout circuit is configured to adapt a count of the iterations in the series.

13. The imaging device according to claim 1, wherein the readout circuit is configured to transfer the electrical charge from the photodetector to the storage capacitance, both for the iterations in the series and for the final iteration, and then derive the output digital value from the voltage on the storage capacitance.

14. An imaging device, comprising:
a pixel-circuit comprising a photodetector, the photodetector configured to accumulate electrical charge in response to incident light; and
a readout circuit, configured to:
perform a series of iterations, each iteration comprising (i) accumulating an electrical charge in the photodetector during an integration time, (ii) transferring a portion of the electrical charge accumulated in the photodetector to a floating less than all the diffusion, the portion being electrical charge accumulated in the photodetector, and (iii) coupling a voltage of the floating diffusion to a storage capacitance;
subsequently, in a final iteration, transfer a remaining electrical charge from the photodetector; and
derive an output digital value, indicative of a total energy of the light incident on the photodetector over the series of iterations and the final iteration, from the voltage on the storage capacitance and from the remaining electrical charge transferred in the final iteration,
wherein the readout circuit is configured to:
transfer the electrical charge from the photodetector to the storage capacitance for the iterations in the series, and derive a first interim digital value from the voltage on the storage capacitance;

transfer the electrical charge from the photodetector to the storage capacitance separately for the final iteration, and derive a second interim digital value from the voltage on the storage capacitance; and derive the output digital value from the first and second interim digital values.

15. An imaging method, comprising:

accumulating electrical charge in a photodetector in response to incident light;

performing a series of iterations, each iteration comprising (i) accumulating an electrical charge in the photodetector during an integration time, (ii) transferring a portion of the electrical charge accumulated in the photodetector to a floating diffusion, the portion being less than all the electrical charge accumulated in the photodetector, and (iii) coupling a voltage of the floating diffusion to a storage capacitance;

subsequently, in a final iteration, transferring a remaining electrical charge from the photodetector; and deriving an output digital value, indicative of a total energy of the light incident on the photodetector over the series of iterations and the final iteration, from the voltage on the storage capacitance and from the remaining electrical charge transferred in the final iteration, wherein coupling the voltage of the floating diffusion to the storage capacitance is performed via a variable capacitance, and comprising varying a capacitance of the variable capacitance across the series of iterations, thereby coupling to the storage capacitance a weighted average of voltages of the floating diffusion from the iterations.

16. The method according to claim 15, further comprising resetting the floating diffusion, and coupling the voltage of the floating diffusion via the variable capacitance to a reset storage capacitance.

17. The method according to claim 15, further comprising sharing the variable capacitance with at least one other photodetector.

18. The method according to claim 15, further comprising adapting a count of the iterations in the series.

* * * * *